United States Patent
Annam et al.

(10) Patent No.: US 11,909,727 B2
(45) Date of Patent: *Feb. 20, 2024

(54) NETWORK CONFIGURATION AND MANAGEMENT

(71) Applicant: VISA INTERNATIONAL SERVICE ASSOCIATION, San Francisco, CA (US)

(72) Inventors: Hari Krishna Annam, Sunnyvale, CA (US); Mohit Gupta, Foster City, CA (US); Soumendra Bhattacharya, Union City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,838

(22) Filed: Aug. 31, 2022

(65) Prior Publication Data

US 2023/0006982 A1    Jan. 5, 2023

Related U.S. Application Data

(63) Continuation of application No. 16/834,007, filed on Mar. 30, 2020, now Pat. No. 11,451,525, which is a (Continued)

(51) Int. Cl.
*G06F 21/00* (2013.01)
*H04L 9/40* (2022.01)
(Continued)

(52) U.S. Cl.
CPC ........ *H04L 63/0471* (2013.01); *H04L 9/0825* (2013.01); *H04L 9/0863* (2013.01);
(Continued)

(58) Field of Classification Search
CPC . H04L 63/0471; H04L 9/0825; H04L 9/0863; H04L 9/3213; H04L 9/3226;
(Continued)

(56) References Cited

U.S. PATENT DOCUMENTS

| 8,402,555 | B2 | 3/2013 | Grecia |
| 8,533,860 | B1 | 9/2013 | Grecia |

(Continued)

OTHER PUBLICATIONS

Corrected Notice of Allowability dated Feb. 12, 2020 for U.S. Appl. No. 15/444,872 (pp. 1-2).

(Continued)

*Primary Examiner* — Ghazal B Shehni
(74) *Attorney, Agent, or Firm* — K&L Gates LLP

(57) ABSTRACT

An Internet-connected device, such as a car, refrigerator, or even a laptop can use a second device, such as a cell phone, to support cryptographic operations and communication with token service providers or other processing services requiring pre-provisioned capabilities that may include cryptographic secrets. By removing the need to store personally sensitive data in "Internet of Things" (IoT) devices, a user's personal information and other sensitive financial information may be contained to a relatively small number of devices. This may help prevent theft of goods or services by IoT devices that are not always under the close control of the user.

20 Claims, 5 Drawing Sheets

Related U.S. Application Data continuation of application No. 15/444,872, filed on Feb. 28, 2017, now Pat. No. 10,609,004.

(51) Int. Cl.
| | | |
|---|---|---|
| *H04L 9/32* | (2006.01) | |
| *H04L 9/08* | (2006.01) | |
| *H04W 12/02* | (2009.01) | |
| *H04W 84/12* | (2009.01) | |
| *H04W 12/06* | (2021.01) | |

(52) U.S. Cl.
CPC .......... *H04L 9/3213* (2013.01); *H04L 9/3226* (2013.01); *H04L 63/0442* (2013.01); *H04L 63/0823* (2013.01); *H04W 12/02* (2013.01); *H04W 12/068* (2021.01); *H04W 84/12* (2013.01); *H04L 63/0281* (2013.01); *H04L 2209/56* (2013.01)

(58) Field of Classification Search
CPC ............. H04L 63/0442; H04L 63/0823; H04L 63/0281; H04L 2209/56; H04W 12/02; H04W 12/068; H04W 84/12
See application file for complete search history.

(56) References Cited

U.S. PATENT DOCUMENTS

| | | | |
|---|---|---|---|
| 8,887,308 | B2 | 11/2014 | Grecia |
| 9,294,476 | B1 | 3/2016 | Lurey |
| 10,609,004 | B2 | 3/2020 | Annam |
| 11,451,525 | B2 | 9/2022 | Annam |
| 2007/0256141 | A1 | 11/2007 | Nakano |
| 2015/0100788 | A1* | 4/2015 | Chastain ............. H04L 63/0853 713/168 |
| 2016/0012433 | A1 | 1/2016 | Marenick |
| 2016/0098693 | A1 | 4/2016 | Shauh |
| 2016/0300237 | A1 | 10/2016 | Khan |
| 2017/0055148 | A1 | 2/2017 | Zimmerman |
| 2017/0264597 | A1 | 9/2017 | Pizot |
| 2018/0144563 | A1* | 5/2018 | Reymann ................ E05F 15/76 |
| 2018/0248857 | A1 | 8/2018 | Annam |
| 2020/0228508 | A1 | 7/2020 | Annam |

OTHER PUBLICATIONS

Corrected Petition for *Inter Partes* Review of U.S. Pat. No. 8,533,860 Challenging Claims 1-30 Under 35 U.S.C. . sctn.312 and 37 C.F.R. sctn.42.104, dated Mar. 14, 2016, before the USPTO Patent Trial and Appeal Board, IPR 2016-00600, 65 pages.

Notice of Allowance dated Dec. 27, 2019 for U.S. Appl. No. 15/444,872 (pp. 1-8).

Office Action (Notice of Allowance and Fees Due (PTOL-85)) dated May 17, 2022 for U.S. Appl. No. 16/834,007 (pp. 1-8).

Office Action dated May 15, 2019 for U.S. Appl. No. 15/444,872 (pp. 1-7).

Office Action dated Oct. 20, 2021 for U.S. Appl. No. 16/834,007 (pp. 1-8).

Petition for *Inter Partes* Review of U.S. Pat. No. 8,402,555 Challenging Claims 1-26 Under 35 U.S.C. 312 and 37 C. F.R. 42.104, dated Mar. 22, 2016, before the USPTO Patent Trial and Appeal Board, IPR 2016-00789, 65 pages.

Petition for *Inter Partes* Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.

Petition for *Inter Partes* Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.

\* cited by examiner

NETWORK CONFIGURATION AND MANAGEMENT

CROSS-REFERENCE TO RELATED APPLICATION

The is a continuation application of U.S. patent application Ser. No. 16/834,007, filed on Mar. 30, 2022, which is a continuation of U.S. patent application Ser. No. 15/444,872, filed on Feb. 28, 2017, now U.S. Pat. No. 10,609,004, whose disclosure is incorporated by reference in its entirety herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Internet of Things (IoT) allows devices of all types, from thermostats to refrigerators to connect to the Internet and report status, receive instructions, and generally provide features and services to users that were previously unavailable in an unconnected device. However, many of these connected devices do not have trusted zones that safely store cryptographic secrets used for one-way or mutual authentication, encrypting or decrypting documents, and signing or signature verification of documents, among others. The lack of security puts many potential communication-related uses of a device at risk of eavesdropping, identity theft, or fraud. Even if the IoT device has trusted zone capability, an owner or operator may choose to not provision the IoT device. This may be done in order to prevent unintended exposure of personal data in the case of a hacking attempt or to prevent undesired communications from being made, such as online purchase transactions. In either case, these real or enforced limitations prevent the IoT device from adequately performing one or more functions that may desirable at some point to an owner or operator of the IoT device.

SUMMARY

Connected devices include hundreds of millions of cell phones and now additional millions, if not billions, of automobiles, electric meters, kitchen appliances, watches, and other wearable devices, devices often referred to as the Internet of Things (IoT). Often, these devices lack secure storage that can be used to store cryptographic secrets or may have other limitations that make secure communications difficult or impossible. In other cases, even if such a device is capable of supporting a cryptographically secure environment, there may be reasons to not fully provision the device for such activity.

These IoT or "origin" devices may use a nearby enabler device with such a cryptographically secure environment as an intermediary for the origin device when these higher order tasks are being attempted, such as securely reporting status or for placing an order for goods or services. For example, the enabler device may be provisioned with cryptographic capabilities and cryptographic secrets that support secure communications from a home monitoring system, home appliance, automobile, etc. In this manner, the enabler device may be used to support secure communications for any number of different IoT devices without requiring trusted zones, cryptographic secrets, or token provisioning in each individual IoT device.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

For the purpose of this disclosure, the term origin device will be used to represent, without limitation to the actual type of device being referred to, any connected device that is unable or unwilling to support secure communication with another entity and, therefore, uses an enabler device to provide such support. The enabler device is expected to be physically near enough to use a short-range communication protocol such as Bluetooth, WiFi, Zigbee, or similar protocols. In some embodiments, a personal identification number (PIN) may be required to be entered in both the origin and enabler devices in order to help ensure proximity of the devices, among other purposes.

As discussed above, an origin device may require secure communication with a downstream party, for example, when a communication involves information that potentially exposes personal or financial data. When the origin device is unable to provide the required level of security or functionality for any reason, the origin device may advertise for the services of an enabler device to provide the required level of secure communication services to complete the required communication.

The inability to support secure communications may be an inherent limitation of the origin device, such as a lack of secure storage for key matter, may be due to limited resources, such as memory, computational power, or user interface. In other cases, it may simply be because the owner/operator of the device chooses not to provision the origin device with such a capability.

Figure 1:
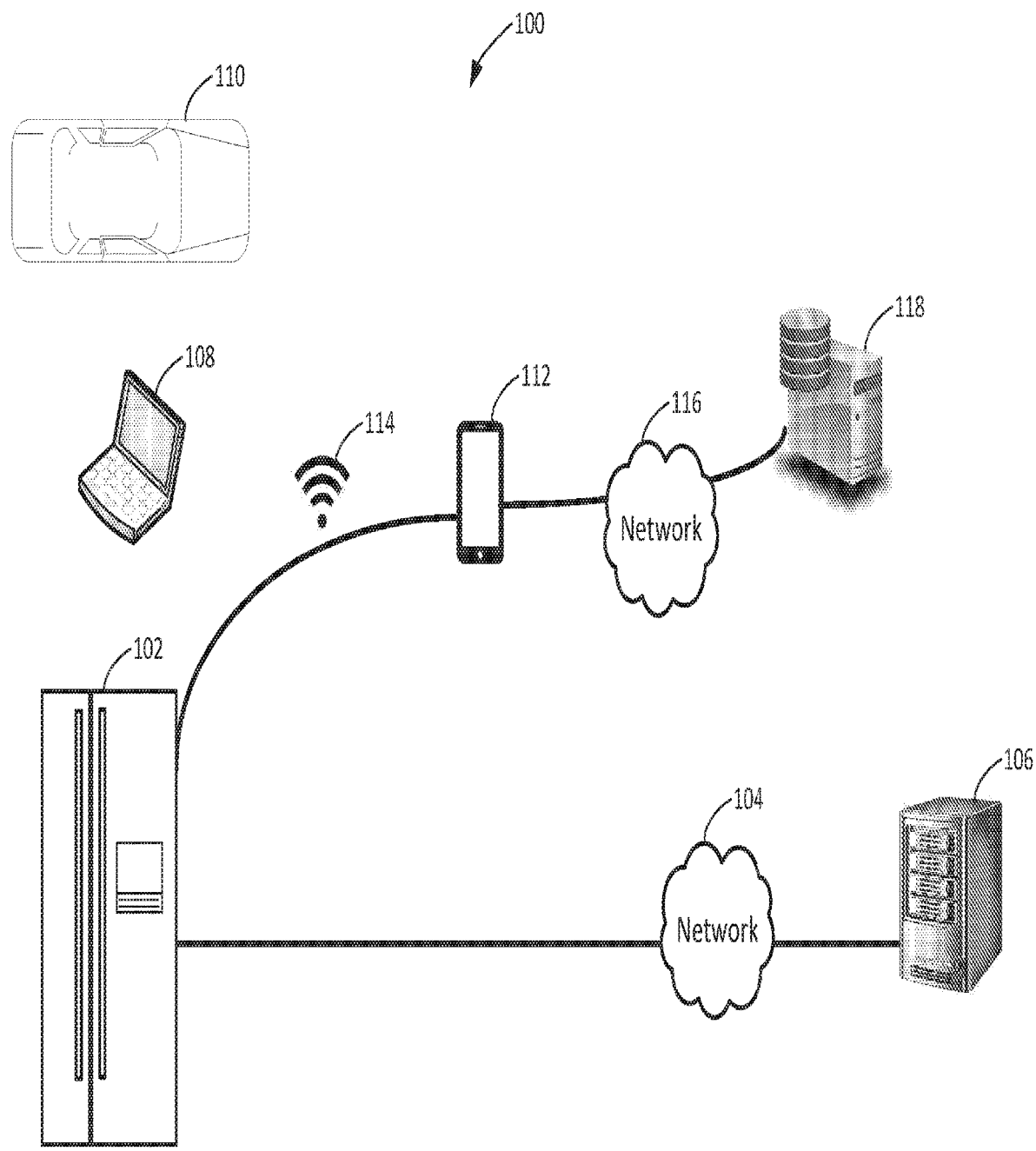
FIG. 1 is a block diagram illustrating IoT devices and an enabler device in accordance with the instant disclosure.

FIG. 1 illustrates a representative environment supporting a system 100 comprising an origin device 102 and an enabler device 112 for supporting secure communication between the origin device 102 and an end point, such as a web server 106. The origin device 102 may be one of several exemplary origin devices that may use the enabler device 112 in the manner described including a laptop 108 and an automobile 110. While it is possible, or even likely, that the laptop 108 is capable of hosting a secure communication session, such as a secure file transfer or a purchase transaction, there may be reasons why a user of the laptop 108 may not want to use that capability. For example, if the laptop 108 is owned by an employer, the user may not wish to provision the laptop 108 with his or her credentials. In another embodiment, the laptop 108 may be shared among many users and an account holder may wish to prevent unauthorized purchases that might be made if financial instruments were to be provisioned into the laptop 108. Similarly, the automobile 110 may be used by many operators, all of whom may not be authorized to make purchases or report usage data.

An enabler device 112 may be directly accessible to the origin devices 102, 108, 110 via wireless network 114. In many cases, the wireless network 114 may be a WiFi network following an IEEE 802.11 standard. As discussed below, some device's ability to use different aspects of WiFi simultaneously presents certain advantages for the process described herein, but other networks such as Bluetooth, Near Field Communication (NFC), Zigbee, or even wired connections are capable of supporting communication between an origin device 102 and an enabler device 112.

The origin device 102 and the enabler device 112 are also capable of communication beyond the local environment via networks 104 and 116. In some embodiments, the networks 104 and 116 may be the same network connection. For example, in a home environment, both the origin device 102 and the enabler device 112 may connect via wireless network 114 to a wireless router (not depicted) that gives each device 102, 112 access to a wide area network 104, such as the Internet. In other embodiments, the origin device 102 may connect to the network 104 via the wireless router while the enabler device 112 may connect via a wide area wireless network 116 such as a 4G cellular data network. The enabler device 112 connection to a financial platform, for example, a token service provider 118 is discussed below.

The origin device 102 may connect to a web server 106 in the course of its normal operation. The origin device 102 may send reports regarding its own operational status, routine maintenance or repair needs, or other relatively non-sensitive data. For example, a refrigerator may report temperature or an automobile may report the need for an oil change, either of which may not be considered particularly sensitive.

However, other data, such as how many times a refrigerator door has been opened, over time, may indicate when a home is not occupied. Similarly, a history of temperatures from an automated thermostat may be used to determine when a residence is typically unoccupied. When uploading this kind of data for analysis, additional security may be desirable.

Purchase transactions are another communication type that may benefit from use of the enabler device 112. While a refrigerator that can analyze its contents and automatically place orders may be a great convenience, provisioning a kitchen appliance with its own financial payment instruments may be undesirable or simply inconvenient.

In these cases, the use of an enabler device 112 fills a dual role. The enabler device 112 provides the resources for secure communication to the origin device 102. The enabler device 112 also helps to ensure that an authorized person, or at least a person with physical access to the origin device 102, is aware of the intended communication. Further, in the case of financial transactions, the authorized person is using his or her own financial instrument provisioned on the enabler device 112 to complete the transaction, thus avoiding a concern about someone other than the financial instrument owner but who has access to the origin device 102 from making unauthorized purchases. This may be especially true in the case of an automobile 110, where a stolen car that is provisioned with a financial instrument for making purchases could increase the overall loss associated with such an incident.

Figure 2:
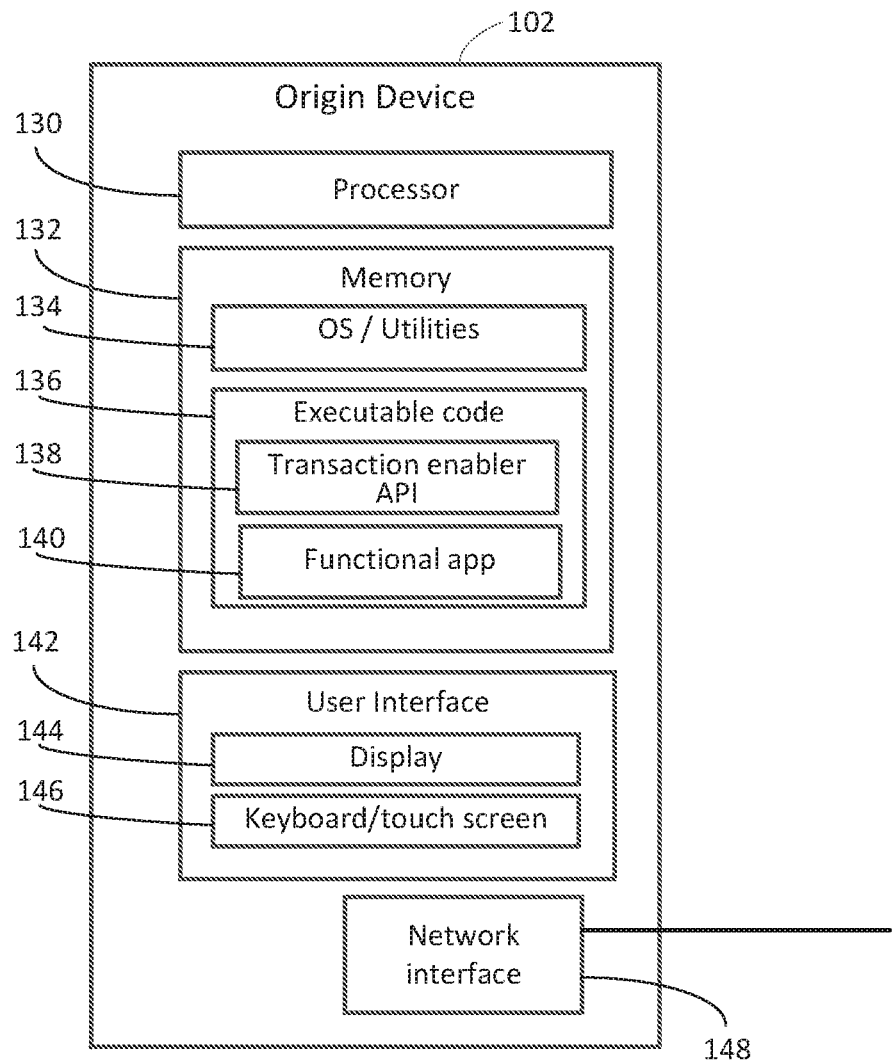
FIG. 2 is a block diagram of an exemplary IoT or origin device.

A block diagram of an origin device 102 configured in accordance with the current disclosure is illustrated in FIG. 2. The origin device 102 may be any of a number of devices, such as devices considered under the general classification of IoT devices. The origin device 102 may include a processor 130 and memory 132. The memory 132 may be a combination of volatile and non-volatile physical memory but does not include storage via carrier wave or propagated media. The memory 132 may contain both an operating system (OS)/utilities 134 and executable code 136. The OS and utilities 134 may support the basic operation of the origin device 102 including file access, diagnostics, communication support, start up, shut down, etc. The executable code 136 may include a functional application 140 that includes various routines and data used to control some or all the functions of the origin device 102. This code 140 may be specific to that particular device. For example, in an automobile 110, the executable code 136 may be generally responsible for operation of an entertainment system or an engine control system. In a refrigerator, the functional application 140 may be responsible for maintaining refrigerator and freezer temperatures, automatic defrost cycles, open door monitoring, etc.

The memory 132 may also include a transaction enabler (TE) application 138, which in some embodiments, represents a redesign of an existing device, even an existing IoT device, to provide functions supporting discovery, handshaking, PIN management, and channel setup between the origin device 102 and the enabler device 112. The TE application 138 may be used to manage the origin-side functions associated with using an enabler device 112 to handle secure communications. These functions are discussed in more detail below but may include, without limitation, wireless discovery, PIN management, and local key derivation. In an embodiment, the TE application 138, or a function of the OS/utilities 134 may provide for certain cryptographic functions, such as software encryption/decryption and local session key derivation. Since these functions, at least as described below, are local and temporal, for example, for use in encrypting communication between the origin device 102 and the enabler device 112 that do not contain sensitive personal data, the need for high levels of security are reduced compared to communication over a wide area network 104.

The origin device may include a user interface (UI) 142. In one embodiment, the UI 142 may have a display 144 and a keypad or keyboard 146. In another embodiment, the UI 142 may be or include a touchscreen display being a combination of a display 144 and an input capability 146. A network interface 148 may support wired and wireless communication over, for example, a WiFi network 114 or WiFI local area network (LAN). WiFI LAN involves a typical communication between the origin device 102 and a wireless access point or wireless router.

In some embodiments, the network interface 148 may also support WiFi Direct, which allows peer-to-peer communication between devices, for example, between the origin device 102 and the enabler device 112 without the use of a wireless access point, e.g., a wireless router. In a case where the network interface 148 supports multiple WiFI modes, such as simultaneous LAN and Direct modes, the communications described below may be held in sequence between the communication parties without interruption to change WiFi modes. In another embodiment, where the network interface 148 does not support simultaneous LAN and Direct modes, the data from the various legs of communication may need to be cached and the required communication mode be switched to accomplish seamless communication.

The illustrated origin device 102 is depicted without a trusted zone, but as discussed above, there is no restriction on whether an origin device 102 does or does not have a trusted zone, only that in at least some circumstances, it may be desirable to shift some or all of the functions associated with a trusted zone to an enabler device 112.

Figure 3:
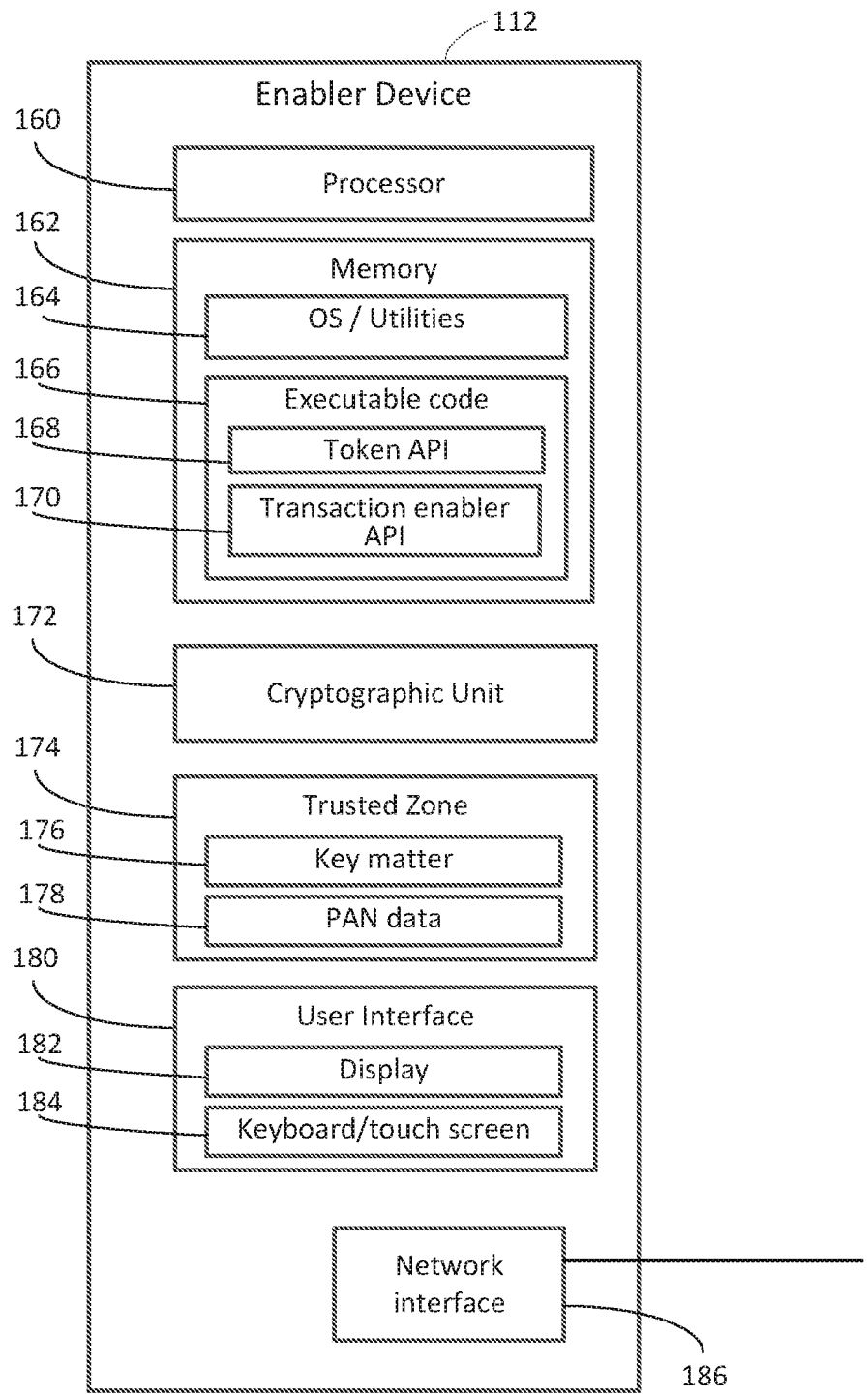
FIG. 3 is a block diagram of an exemplary enabler device.

FIG. 3 illustrates an exemplary enabler device 112. In an embodiment, the enabler device 112 may be based on a cellular phone, such as a smart phone. Other base units may also be modified into an enabler device 112 such as wearable devices or laptops. The enabler device 112 may include a processor 160, a memory 162, a cryptographic unit 172, a trusted zone 174, a user interface (UI) 180, and a network interface 186. A cryptographic unit 172 may provide necessary cryptographic functions including encrypting and decrypting, hashing, key generation, signing, and signature verification, among others, and may support both symmetric and asymmetric encryption. For example, the cryptographic unit 172 may support AES for symmetric encryption and RSA or elliptic curve for asymmetric encryption.

A trusted zone 174 may be used to store cryptographic secrets used in communications with other devices and for locally encrypting data. The trusted zone 174 may be used to store various keys, such as shared symmetric keys or private keys from PKI key-pairs. The trusted zone 174 may also store other privacy-related data such as personal account number (PAN) data that can be used to access financial accounts, medical records, or other personal accounts. The trusted zone 174 may be referred to by specific names in some products. For example, products from Apple, Samsung, and Microsoft may embody the functions of a trusted zone 174 in, respectively, a Secure Element, a Trusted Execution Environment, and a Trusted Platform Module. In some embodiments, the trusted zone 174 may be a smart chip, similar to a SIM card or the active element of a financial chip card. In some embodiments, the cryptographic unit 172 and the trusted zone 174 may be incorporated into the same physical structure. For example, it is common for smart chips to include cryptographic calculation capabilities.

As with the origin device 102, the enabler device 112 may have a user interface 180 may be used to provide data to and receive instructions from a user. The UI 180 may include a display 182 and some form of tactile input such as keyboard or touchscreen 184. In other embodiments, the UI 180 may include an audio input system for voice recognition. Improvements in gesture-based, eye following, and other developments in user interface technology are expected in the near future and would be expected to be incorporated into the enabler device 112, the origin device 102, or both.

A network interface 186 may support communication with external entities and may include support for both local and wide area networks and may, as discussed above, support simultaneous communication with separate endpoints.

Also as above, the memory 162 may be a combination of volatile and non-volatile physical memories that do not include storage using carrier waves or propagated media. The memory 162 may include an operating system (OS)/utilities 164 performing functions similar to or the same as those described above, but in any case oriented toward the type of device. In an embodiment, the memory 162 may also include executable code used to support the base function of the enabler device 112. For example, in the case of a cellular smart phone the executable code may support cellular voice and data communications, one or more cameras, clocks and timers, and various downloaded applications (apps). The enabler device 112 may also be provisioned with a token application program interface (API) 168 that is used by one or more applications to support communication with a token service provider 118. That is, the token API 168 may be provisioned onto the enabler device 112 and instantiated by any application that needs to interact with the token service provider 118. Another API provisioned on the enabler device 112 may be a transaction enabler 170. The transaction enabler API 170 may be used to communicate with the origin device 102 by supporting functions such as WiFi service discovery and data transfer and to also invoke the services of the token API 168 as required.

Figure 4:
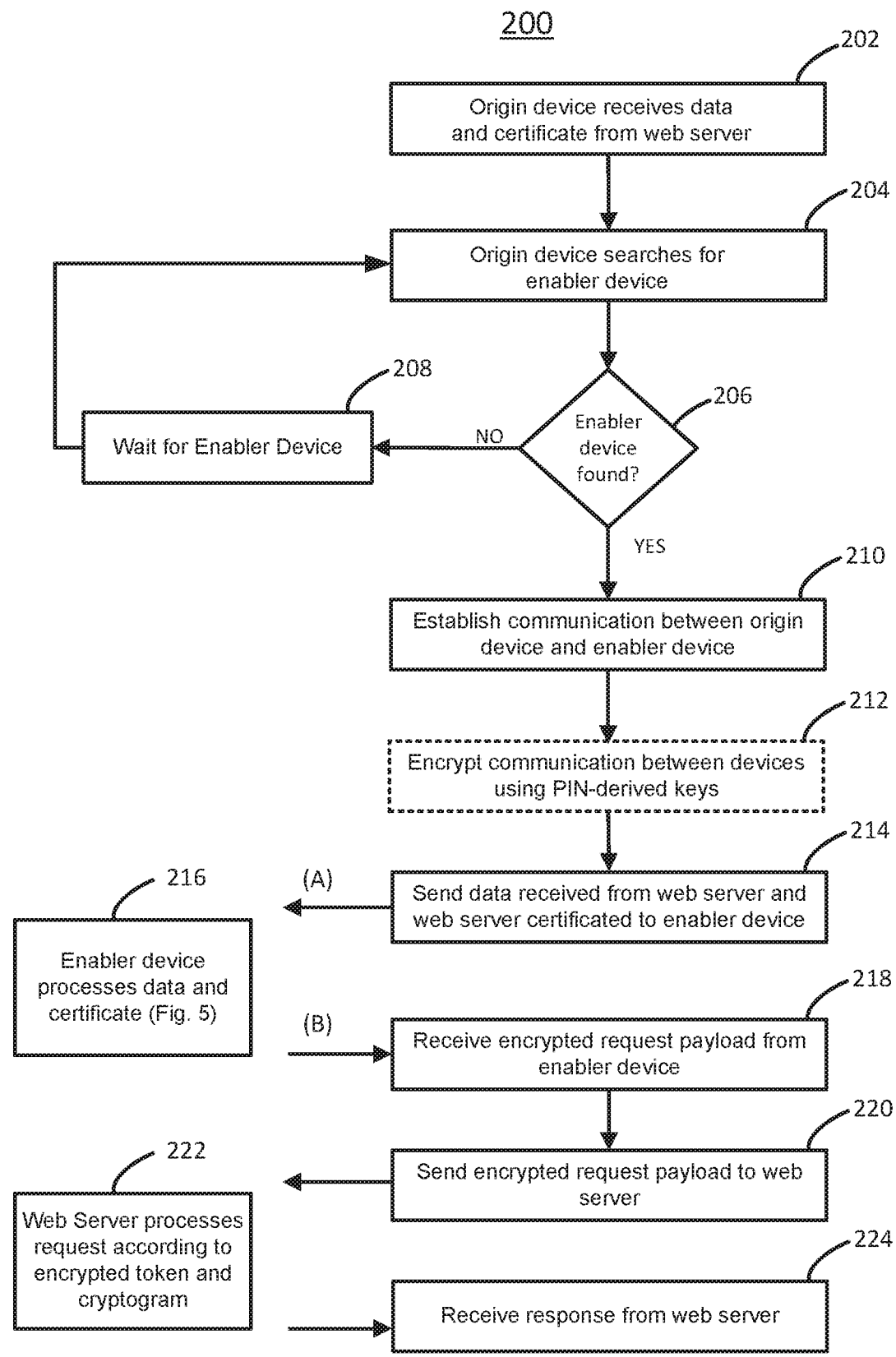
FIG. 4 is a flowchart of network configuration and management in accordance with the current disclosure.
Figure 5:
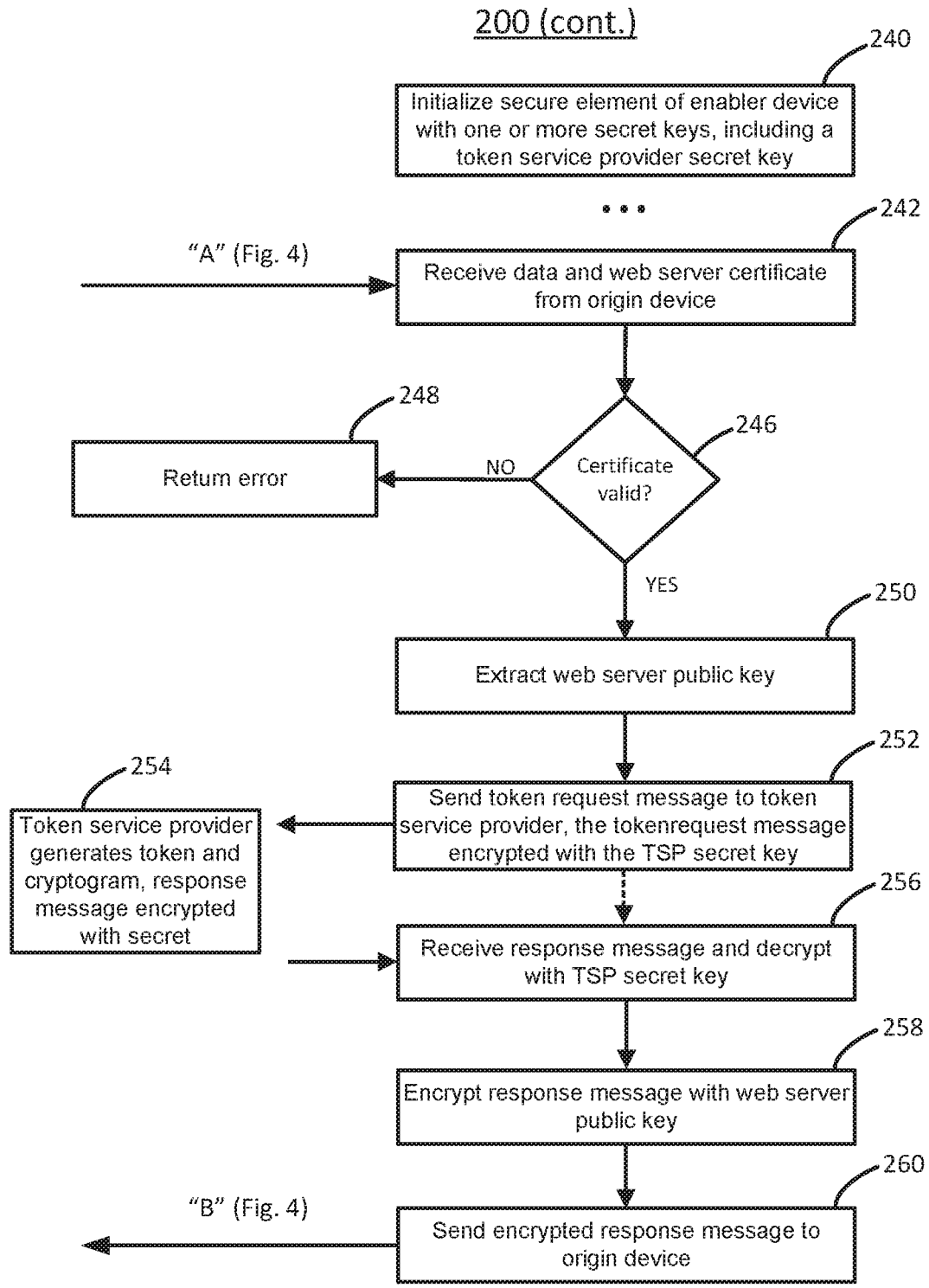
FIG. 5 is a flowchart continuing the flowchart of FIG. 4.

FIGS. 4 and 5 are flowcharts illustrating various aspects of operation of the system 100 and its use in providing secure communications to an origin device 102 via an enabler device 112. Briefly, when the origin device 102 desires a secure communication and either does not have the required capabilities to support the communication or has those capabilities but they are not currently available, the origin device 102 uses the services of another device to provide the capabilities missing at the origin device 102. The services not at hand in the origin device 102 may include strong cryptographic support, secure storage of cryptographic secrets, or provisioning to participate in a token-based transaction environment. FIG. 4 is a flowchart of a method 200 of providing these services to an origin device 102 via an enabler device 112.

At block 202, the origin device 102 obtains data corresponding to communication with a web server 106. In one example, the origin device 102 may wish to securely report usage data to the web server 106. In another example, the origin device 102 may be in communication with the web server 106 regarding a proposed purchase, such as a smart refrigerator recognizing that milk on hand has gone below a predetermined level and an order should be placed. The origin device 102 may contact the web server 106 of a designated merchant and add milk and any other shopping list items to a cart on the web server 106, in anticipation of a payment transaction. In such a case, the web server 106 may have provided to the origin device 102 transaction (or cart) data and a certificate that are used as described below. In either the data transfer or the purchase transaction examples, a setting may have been established that these types of communications are only to be performed using a level of security that the origin device 102 is not capable of supporting.

At block 204, the origin device 102 may search for an enabler device 112 that is capable of providing the necessary level of security. The search may be via a Wi-Fi Direct protocol using a service discovery request that allows nearby devices to respond with their ability to support the services required. If an enabler device 112 cannot be found, the "no" branch from block 206 may be taken to block 208. There, a message may be displayed at the origin device 102 that no enabler device is available and the search for a suitable device repeats at block 204. When, at block 206, an enabler device 112 is found execution follows the "yes" branch to block 210 where communication between the origin device 102 and the enabler device 112 is established via applications using respective transaction enabler APIs 138 and 170. In some embodiments, the user of the enabler device 112 may have to perform at least a one-time authorization to the connect to the origin device 102. In an embodiment, the origin device 102 may be programmed to look for and attach to only pre-programmed devices, such as by device name or electronic identification number (EIN) such as when a particular user may want to ensure that he or she is aware of any data downloaded from a particular IoT device 102, 108, 110 or any financial transactions associated with those devices. For example, in a two-part process, a user may first secure a particular enabler device 112 with a fingerprint or passphrase and then second limit communication for data downloads and purchase transactions for an origin device 102 to only that enabler device 112. In an exemplary case, any attempt to change the identity of the paired enabler device 112 at the origin device 102 may result in erasing any sensitive data in the origin device 102.

At block 212, in an embodiment, a personal identification number (PIN) may be entered by a user into one or both of the origin device 102 and the enabler device 112. The PIN may be generated by the origin device 102 and presented to a user for entry into the enabler device 112 or vice versa. In another embodiment, the user may simply be asked to select a number and enter the number into both devices 102, 112. The PIN may be combined with a shared passphrase to generate a session key used to encrypt communication between the origin device 102 and the enabler device 112. Even though the data communicated between these two devices 102, 112 is not necessarily sensitive, the generation and use of the session key ensures that both entities received the same PIN, thereby providing a level of mutual authentication. Verification of the PIN via the session keys also provides a level of assurance that both devices 102, 112 are in the control of someone who has access to the user interfaces 142, 180 of both devices 102, 112, respectively. When session keys are used, all communication payloads sent between the origin device 102 and the enabler device 112 may be encrypted using the session keys. Any of a number of techniques may be used to generate the session keys at both the origin device 102 and enabler device 112.

At block 214, data from the origin device 102 may be sent to the enabler device 112, after being encrypted with the session key, when encryption is used. The data sent may be data that is locally generated at the origin device 102, such as meter or thermostat data, or may be purchase-related data such as a cart reference or price and item data and a web server certificate.

The discussion of the process continues on FIG. 5 as the operations 216 at the enabler device 112 are described. Turning then to FIG. 5, at block 240, the enabler device 112 may have been provisioned with one or more secret keys 176 for use in communication with a downstream entity. In the illustrated embodiment, the downstream entity may be a token service provider 118. In other embodiments, the downstream entity may be another web server, such as a cloud storage device used to store, for example, electricity usage data, home security system data, thermostat data, etc. The secret key or keys may be securely installed in the trusted zone 174 during the provisioning process. The secret keys 176 may be private keys from a PKI infrastructure or may be symmetric keys. The secret keys 176 may be used for authentication, signing and encryption operations.

At block 242, the enabler device 112 may receive payload data from the origin device 102. As discussed above, the payload data for one embodiment may include transaction-related data and a certificate for a web server 106. In some embodiments, the certificate may map to an entity rather than an individual server, based on the actual architecture of the downstream entity. Continuing with the illustrated embodiment, execution continues at block 246, where the certificate is validated via a certificate authority. If the certificate fails to meet the required criteria, execution continues at block 248 where an error may be returned to the origin device 102. If the certificate is valid, execution may follow the "yes" branch from block 246 to block 250. There, the enabler device 112 may extract the public key of the web server 106 for later use.

At block 252, the enabler device 112 may evaluate the nature of the data to be processed on behalf of the origin device 102. In the case of pure data being sent to a cloud service, a simple encryption using an appropriate key may be performed. In the case of a transaction, a default payment instrument may be selected. In another embodiment of a transaction, a user of the enabler device 112 may be asked to select a payment instrument, for example from a list of available instruments that may include credit or debit accounts, rewards point accounts, gift cards, etc.

Once a payment instrument is selected, the enabler device 112 may generate a token request message including transaction details, encrypt the token request message with the token service provider secret key 176 provisioned earlier, and send the encrypted payload to the token service provider 118. At block 254, the token service provider 118 may decrypt the payload using its copy of the secret key 176 and follow a standardized procedure to generate token response message including a token and cryptogram related to the transaction. The token service provider 118 may then encrypt the token response message with its secret key 176 and return the encrypted payload to the enabler device 112. While the use of a secret (i.e. symmetric) key 176 is discussed here for the purpose of illustrating an embodiment, it will be understood that public/private key pairs can be used to accomplish the same functions of privacy and authentication.

At block 256, the enabler device receives the encrypted payload and decrypts the token and cryptogram using the secret key 176. In an alternate embodiment where the data from the origin device 102 is not transaction related, blocks 252 through 256 may not be executed because the use of a token service provider 118 may not be required. Similarly, in embodiments where a token is locally provisioned and the enabler device 112 has the ability to generate the transaction cryptogram, the need to communicate with the token service provider 118 may be reduced or eliminated. That is, the enabler device 112 may simply encrypt the data payload received from the origin device 102 with the secret key provisioned at block 240 and return the encrypted payload to the origin device 102.

At block 258, the token response message including the token and cryptogram generated at the token service provider 118 may be encrypted with the web server public key extracted at block 250. The use of the web server public key for encryption ensures that the token and cryptogram are protected from inspection and/or alteration during transport to the web server 106. For the purpose of illustration, the use of a PKI security model is discussed. In other embodiments, depending on the ultimate endpoint of the data transmission, a pre-provisioned secret (symmetric) key could be used to encrypt the payload at the enabler device 112.

After the token and cryptogram are so encrypted they may be sent, at block 260, back to the origin device 102. As discussed above, the encrypted token and cryptogram may be further encrypted with the session key of the origin device 102.

Returning to FIG. 4, execution may continue at block 218 where the doubly encrypted payload from the enabler device 112 is received and the session key is used to decrypt the transmission. The origin device 102 may send the encrypted token and cryptogram to the web server 106 where, at block 222, the web server may process the request by decrypting the token and cryptogram using its private key and sending the transaction information through the normal financial processing network, which may include resolution of the token into a personal account number (PAN) and approval of the transaction at an issuer. At block 224, the origin device 102 may receive a response from the web server 106 indicating whether the transaction has been approved or denied.

The disclosed system and method uses a modified IoT device (origin device) coupled to a modified device with a trusted zone (enabler device) to allow the origin device 102 without either the processing resources, such as a trusted zone, to participate in secure communications including private data transmission or purchase transactions even though the origin device is either inherently incapable of or not provisioned for the secure processing required to support those functions. That is, a simple connected device that lacks a trusted zone or a support for a payment application may, for a given operation, attach to the enabler device 112 so that the enabler device 112 can provide those services, e.g., services afforded by a trusted zone, that are not available at the origin device. As opposed to PayPal™, a merchant does not redirect a transaction flow to a payment party (PayPay), but rather the origin device 102 simply enlists another device such as a cellular phone to generate a required payload prior to a transaction being initiated. This may include mutual authentication (e.g., via the PIN exchange), encrypting content, and preprocessing the data to generate a cryptogram and token. The use of short range communication networks, such as Bluetooth or WiFi, helps to ensure that an operator of the enabler device 112 is aware of the request from the origin device 102 and can be actively involved in the process. A further benefit is that IoT devices can be configured to use the same enabler device so that a person with multiple IoT devices (cars, thermostats, home security systems, appliances, etc.) can be confident that each device will only participate in sensitive communication via a known enabler device 112 with a pre-defined level of security.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

What is claimed is:

1. A method of supporting a secure communication between an origin device lacking a token service capability and a server by using an enabler device with a token service support, the method comprising:
   receiving, by the enabler device, a message content from the server, wherein the message content is received by the server from the origin device corresponding to a communication with the server;
   activating, by the enabler device, a token service provider by generating a token;
   identifying, by the enabler device via the server, the origin device, wherein the origin device is void of a storage unit for storing data needed for the token service support;
   generating, by the enabler device, a cryptogram corresponding to the token, the message content, or a combination thereof;
   encrypting, by the enabler device, the token and the cryptogram; and
   sending, by the enabler device, the encrypted token and the cryptogram to the origin device for the secure communication with the server.

2. The method of claim 1, further comprising, sending to the origin device a personal identification number (PIN), the PIN used to derive an encryption key used for securing communication between the enabler device and the origin device.

3. The method of claim 2, further comprising, receiving at the enabler device via a user interface of the enabler device, the PIN, the PIN used to derive an encryption key used for securing communication with the origin device.

4. The method of claim 1, wherein receiving the message content by the enabler device further includes receiving a server public key infrastructure (PKI) certificate to the enabler device, the server PKI certificate including the server public key.

5. The method of claim 1, wherein identifying, via a wireless communication process, the origin device having the token support comprises broadcasting a WiFi Peer-to-peer message requesting a response from devices providing token support.

6. The method of claim 1, further comprising: validating a server certificate with a certificate authority prior to activating the encrypted message content by the token service provider.

7. The method of claim 1, wherein encrypting the token and the cryptogram at the enabler device comprises encrypting the message content using a shared secret between the enabler device and the token service provider, the shared secret stored in a trusted zone of the enabler device.

8. The method of claim 1, wherein encrypting the token and the cryptogram at the enabler device comprises encrypting the message content with a shared secret, the shared secret known by the enabler device and the token service provider.

9. The method of claim 8, further comprising decrypting the token and cryptogram at the enabler device using the shared secret.

10. A method of supporting secure communication between an origin device lacking a trusted zone and a server by using an enabler device with trusted zone support, the method comprising:
    receiving, by the enabler device, a message content from the server, wherein the message content is received by the server from the origin device corresponding to a communication with the server;
    activating, by the enabler device, a token service provider by generating a token;
    identifying, by the enabler device via the server, the origin device, wherein the origin device is void of a storage unit for storing data needed for the trusted zone and the trusted zone support, wherein the enabler device having the trusted zone;

generating, by the enabler device, a cryptogram corresponding to the token, the message content, or a combination thereof;

encrypting, by the enabler device, the token and the cryptogram associated with the trusted zone; and sending, by the enabler device, the encrypted token and the cryptogram to the origin device for the secure communication with the server.

11. The method of claim 10, further comprising:

sending, by the enabler device, a personal identification number (PIN); and wherein an encryption key for use in encrypting communication between the origin device and the enabler device is generated at least in part based on the PIN.

12. The method of claim 11, further comprising:

receiving via a user interface of the enabler device, the PIN; and generating a local copy of the encryption key at the enabler device, wherein the local copy of the encryption key used for encrypting communication between the origin device and the enabler device.

13. The method of claim 10, wherein identifying the origin device comprises identifying the origin device via a Wi-Fi Direct message broadcast for communicating with the enabler device.

14. The method of claim 10, further comprising, sending, to the origin device, a server certificate.

15. The method of claim 10, further comprising provisioning a shared secret between the token service provider and the enabler device.

16. The method of claim 10, wherein the token and cryptogram includes data that causes the server to alter its operation to achieve a result desired by the origin device.

17. A system of supporting secure communication between an origin device lacking a trusted zone and a server by using an enabler device with trusted zone support, the system comprising:

the origin device is void of a storage unit for storing data needed for the trusted zone support;

the enabler device having the trusted zone support;

wherein the origin device is configured to receive a message content corresponding to a communication process with the server;

wherein the origin device is configured to send the message content to the enabler device;

wherein the enabler device is configured to receive a token generated at a token service provider;

wherein the enabler device is configured to generate a cryptogram corresponding to the token, the message content, or a combination thereof;

wherein the enabler device is configured to encrypt the token and the cryptogram;

wherein the enabler device is configured to send the encrypted token and the cryptogram to the origin device;

wherein the origin device is configured to send the encrypted token and cryptogram to the server; and wherein the origin device is configured to receive an acknowledgement that the token and cryptogram have been successfully processed at the server.

18. The system of claim 17, wherein the enabler device is configured to execute instructions stored in a first memory that cause the enabler device to:

receive the transaction data from the origin device;

encrypt the transaction data with the one secret;

send the encrypted transaction data to the token service provider;

receive a request payload from the token service provider;

encrypt the request payload with a public key of a merchant server; and return the encrypted request payload to the origin device.

19. The system of claim 18, wherein the origin device is configured to send to a merchant server certificate with the transaction data to the enabler device, and the enabler device is configured to validate the merchant server certificate and extract the merchant server public key.

20. The system of claim 19, wherein the request payload received at the enabler device is encrypted with the one cryptographic secret, wherein the enabler device is configured to decrypt the request payload prior to encrypting the request payload with the merchant server public key.

* * * * *